United States Patent [19]

Schmukler et al.

[11] 4,430,135
[45] Feb. 7, 1984

[54] ADHESIVE BLENDS AND METHODS OF MAKING COMPOSITE STRUCTURES

[75] Inventors: Seymour Schmukler, Palatine; John Machonis, Jr., Schaumburg; Mitsuzo Shida, Barrington, all of Ill.

[73] Assignee: Chemplex Company, Rolling Meadows, Ill.

[21] Appl. No.: 510,419

[22] Filed: Jul. 1, 1983

Related U.S. Application Data

[62] Division of Ser. No. 452,873, Dec. 23, 1982, which is a division of Ser. No. 327,278, Dec. 4, 1981, Pat. No. 4,409,364.

[51] Int. Cl.³ .............................. C08J 5/00; C08J 5/12
[52] U.S. Cl. ......................... 156/244.11; 156/244.12; 156/244.14; 264/261; 264/331.17; 264/331.18; 427/195
[58] Field of Search .............. 156/244.11; 264/331.18; 427/195; 525/74, 78

[56] References Cited

U.S. PATENT DOCUMENTS

| | | | |
|---|---|---|---|
| 3,697,465 | 10/1972 | Joyner et al. | 525/74 |
| 3,856,889 | 12/1974 | McConnell | 525/74 |
| 3,868,433 | 2/1975 | Bartz et al. | 525/74 |
| 3,886,227 | 5/1975 | Van Brederode et al. | 525/74 |
| 4,087,587 | 5/1978 | Shida et al. | 428/500 |
| 4,087,588 | 5/1978 | Shida et al. | 428/500 |

FOREIGN PATENT DOCUMENTS 2081723  2/1982  United Kingdom ................ 525/74

*Primary Examiner*—Carman J. Seccuro
*Attorney, Agent, or Firm*—Wood, Dalton, Phillips, Mason & Rowe

[57] ABSTRACT

Compositions of matter having properties that make them strong adhesives to various substrates and especially for extrusion adhesion to various polar substrates. These compositions comprise blends of a graft copolymer of a polyethylene backbone grafted with at least one grafting monomer comprising one or more polymerizable ethylenically unsaturated carboxylic acids or the anhydrides of such acids blended with a blending resin that is a mixture of one or more high density polyethylenes and one or more polypropylenes. The disclosure also includes composite structures and their method of making comprising one or more substrates and a blend of the above as the adhesive in contact with and united with the substrate or substrates.

2 Claims, No Drawings

ADHESIVE BLENDS AND METHODS OF MAKING COMPOSITE STRUCTURES

This is a division of application Ser. No 452,873 filed Dec. 23, 1982, which in turn is a division of application Ser. No. 327,278 filed Dec. 4, 1981 now U.S. Pat. No. 4,409,364.

BACKGROUND OF THE INVENTION

High density polyethylene (HDPE)-based extrudable adhesives are of great interest because of their higher temperature resistance and better moisture barrier than those based on low density polyethylene (LDPE), linear low density polyethylene (LLDPE), ethylene-vinyl acetate (EVA), ethylene-methyl acrylate (EMA) or other ethylene copolymers. For some reason, which is not completely understood, the HDPE-based adhesives have poorer adhesion to polar polymers than those based on the other polyethylene polymers as described above.

In order to improve adhesion of the HDPE-based adhesives, elastomeric materials have been added to the composition. This solution is not always satisfactory since the elastomer usually lowers the softening point and MI considerably and also affects the stiffness and moisture barrier characteristics of the composition.

SUMMARY OF THE INVENTION

By blending suitable amounts of polypropylene, HDPE and a polyethylene graft copolymer, adhesives have been obtained with excellent adhesive strength to polar polymers like nylon, ethylene-vinyl alcohol copolymers (EVOH), polyvinyl alcohol polymers and copolymers, metals, glass, paper, wood and the like. These composites, also the subject of this invention, can be made by any method known to those skilled in the art. Examples are lamination, coextrusion, coextrusion coating and a combination of these methods or any other method joining dissimilar materials known to those skilled in the art. The reason for the adhesion promotion by addition of polypropylene to these blends is not completely understood.

DESCRIPTION OF THE PREFERRED EMBODIMENTS

The term polyethylene used herein for the grafting backbone includes homopolymers of ethylene and copolymers of ethylene with propylene, butene-1 and other unsaturated aliphatic hydrocarbons, preferably of up to 8 carbon atoms. Preferably, the ethylene polymer is linear. Also, it is preferable sometimes to graft blends of two or more of the homopolymers and copolymers. The polyethylene homopolymers and ethylene copolymers may be prepared by any known process using transition metal catalysts with low or medium pressure or radical initiators with high pressure. Hence, the polymers may be low density polyethylenes, medium density polyethylenes or high density polyethylenes.

The term "high density polyethylene" polymers used herein as a blending resin includes ethylene homopolymers and copolymers of ethylene with propylene, butene-1, hexene-1 and other unsaturated aliphatic hydrocarbons, preferably of up to and including 8 carbon atoms. It is sometimes preferable to use blends of two or more of the above homopolymers or copolymers in the blending resin. Preferably, such high density polyethylene has a density of about 0.94–0.97.

The polypropylene of the blending resin comprises propylene homopolymers and copolymers of propylene with one or more unsaturated aliphatic hydrocarbons, preferably of up to 8 carbon atoms.

While the above polymers represent the preferred embodiments of our invention, they should not be regarded as limiting the invention in any way.

The unsaturated carboxylic acids or acid derivatives used as the grafting monomers include compounds such as acrylic acid, methacrylic acid, maleic acid, fumaric acid, itaconic acid, citraconic acid, mesaconic acid, maleic anhydride, citraconic anhydride, itaconic anhydride, 4-methyl cyclohex-4-ene 1,2-dicarboxylic acid anhydride, bicyclo(2.2.2)oct-5-ene-2,3-dicarboxylic acid anhydride, 1,2,3,4,5,8,9,10-octahydronaphthalene-2,2-dicarboxylic acid anhydride, 2-oxa-1,3-diketospiro(4,4)non-7-ene, bicyclo(2.2.1)hept-5-ene-2,3-dicarboxylic anhydride, maleopimaric acid, tetrahydrophthalic anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers described in U.S. Pat. Nos. 3,873,643 and 3,882,194, both assigned to the assignee hereof. Cograft copolymers as described in U.S. Pat. No. 3,882,194 are also useful in this invention. The method of preparation of the graft copolymers are described in the above U.S. patents.

It is often desirable to use more than one grafting monomer in order to control the physical properties of the final products. The method in general consists of heating a mixture of the polymer or polymers and the monomer or monomers with or without a solvent. The mixture can be heated to above the melting point of the polyolefin with or without a catalyst. Thus, the grafting occurs in the presence of air, hydroperoxides, other free radical catalysts or, preferably, in the essential absence of those materials where the mixture is maintained at elevated temperatures and (if no solvent is used) preferably under high shear.

The graft and cograft copolymers used in this invention are recovered by any method or system which separates or utilizes the graft copolymer that is produced. Thus, the term includes recovery of the copolymer in the form of precipitated fluff, pellets, powders and the like, as well as further chemically reacted or blended pellets, powders and the like or in the form of shaped articles formed directly from the resulting copolymer.

Any of the commonly known hydroperoxides which have a half life of at least 1 minute at 145° C. may be used in the method of this invention. Such hydroperoxides have the general formula R—O—OH, wherein R is an organic radical. Among the suitable hydroperoxides are t-butyl hydroperoxide, p-menthane hydroperoxide, pinane hydroperoxide, and cumene hydroperoxide, as well as others known in the art. The elevated temperature causes rapid decomposition of the hydroperoxide which catalyzes the reaction between the polyolefin and monomer to form the graft copolymer.

Obviously, the more homogeneous the mixture prior to heating, the less mixing will be required of the solution or molten composition. Generally, in order to obtain a desirable conversion, it has been found that some form of mixing is highly desirable in the absence of a solvent even when a uniform mixture of all of the components of the composition is formed prior to heating. In general, when a solvent is not used, the composition should be heated to a temperature above about 130° C. and it is preferred to use temperatures ranging from about 200°–450° C.

Temperatures substantially above about 450° C. are generally to be avoided in order to avoid the danger of substantial decomposition of the polymeric ingredients. However, if the decomposition products are not undesirable in the product, as in the production of high melt index waxes, higher temperatures may be employed. The reaction time required is quite short, being of the magnitude of from a few seconds to about twenty minutes, although extended heating times do not substantially affect the product and may be employed when desired for any reason.

A convenient method of accomplishing the reaction is to premix the ingredients and then extrude the composition through a heated extruder. Other mixing means, such as a Brabender mixer, a Banbury mixer, roll mills and the like may also be employed in the process. In order to prevent undue increase in molecular weight with a possibility of some cross-linking at elevated temperatures, it is desirable to carry out the reaction in a closed vessel. A conventional single or multiple screw extruder accomplishes this result without the use of auxiliary equipment and for this reason is a particularly desirable reaction vessel.

Adhesives of this invention can be used in composites containing polar substrates such as nylon, ethylene vinyl alcohol copolymers (EVOH), polyvinyl alcohol (PVA), polyester, polyurethane, metals, etc. These compositions can be just two layers or they can be three or more layers with materials which adhere to either layer being added to the structure. For instance, polyolefins like polyethylene (PE), ethylene vinyl acetate copolymers (EVA) or ethylene copolymers with other monomers and polypropylene (PP) can be used in these layers. It is obvious that many combinations can be made by one skilled in the art of using the principles disclosed.

Examples of composites of this invention are: adhesive/nylon, adhesive/aluminum, adhesive/EVOH, PP/adhesive/nylon, PE/adhesive/nylon, EVA/adhesive/PVA, PP/adhesive/PVA, EVA/adhesive/EVOH, PP/adhesive/aluminum, PE/adhesive/aluminum, PE/adhesive/EVOH, PP/adhesive/EVOH, EVA/adhesive/aluminum, PE/adhesive/steel, PP/adhesive/copper, EVA/adhesive/glass, PP/adhesive/wood, PE/adhesive/polyurethane. Four and five layer or more layer constructions incorporating the above layers can be made. As examples only, multilayer structures may be prepared, such as, PP/adhesive/nylon/adhesive/EVA, PP/adhesive/EVOH/adhesive/PE, PE/adhesive/nylon/adhesive/PP, PE/adhesive/aluminum/adhesive/EVA. The word "adhesive" means an adhesive blend of this invention. The above composites are for examples only. It is obvious that many more structures can be made by one skilled in the art.

In preparing composites one can use any means for joining two or more layers known to those skilled in the art. Preferable methods are blown film coextrusion, cast film and sheet coextrusion, blow molding coextrusion, lamination and coextrusion coating. Other methods are powder coating, rotomolding, profile coextrusion, wire coating coextrusion, etc.

In preparing blends of this invention from the above graft copolymers, polypropylene and ethylene homopolymers and copolymers, any blending equipment or technique may be used. As an example only, blends can be prepared in an electrically heated Brabender Plasticorder mixing head using a scroll type mixer under the following conditions: temperature—400° F., rotor speed—120 rpm and mixing time—10 min. after flux. The resultant blends were compression molded into films approximately 0.005–0.007 inches thick. The films were then heat sealed to the substrate under evaluation at an appropriate temperature and time. These conditions are:
1. Nylon 6—430° F., 2 sec.
2. Ethylene-vinyl alcohol copolymer (EVOH)—430° F., 5 sec.
3. Polypropylene—500° F., 5 sec.
4. Aluminum—430° F., 2 sec.

The resultant composites were tested by cutting into strips one inch wide. Adhesion is then tested by the T-peel test similar to that described in ASTM D 187-72.

EXAMPLE 1

A blend was prepared containing 45% of a propylene-ethylene block copolymer with an MFR of 2 and a density of 0.90, 45% of a high density polyethylene (HDPE) with an MI of 2.7 and a density of 0.958 and 10% of a HDPE grafted with XMNA. A film of this material was heat sealed to a film of an ethylene-vinyl alcohol copolymer for 5 sec. at 430° F. The T-peel adhesion of the bond is 7.8 lbs/in.

EXAMPLE 2

The same blend used in Example 1 was heat sealed to nylon 6 for 2 sec. at 430° F. A T-peel adhesion of 3.7 lbs/in is observed.

EXAMPLE 3

A blend was prepared containing 45% of a propylene-ethylene block copolymer with an MFR of 4 and a density of 0.90, 45% of an HDPE with a density of 0.96 and an MI of 0.8, and 10% of an HDPE grafted with XMNA. Adhesion to EVOH is 3.3 lbs/in under the testing conditions of Example 1.

EXAMPLES 4–10

Blends of an HDPE with a density of 0.96 and an MI of 0.8 g/cc, a propylene-ethylene block copolymer with an MFR of 2.0 and a density of 0.90 and an HDPE grafted with XMNA were prepared and heat sealed to EVOH for 5 sec. at 430° F. The results are shown in Table I. Excellent adhesion to EVOH can be obtained for blends containing both HDPE and PP when compared to a blend containing only HDPE.

The same blends as described above were heat sealed to a random polypropylene (PP) for 5 sec. at 500° F. The T-peel adhesion of these samples are shown in Table I. Excellent adhesion to PP can be obtained for blends containing both HDPE and PP when compared to a blend containing only HDPE.

EXAMPLES 11–17

Blends were prepared using the HDPE, the propylene-ethylene block copolymer and graft copolymer described in Example 4. Blends were heat sealed for 2 sec. to nylon 6 at 430° F. The adhesion results are shown in Table II. It can be seen that excellent adhesion can be obtained to nylon 6 using blends in which PP is added to a mixture of HDPE and a graft copolymer.

TABLE I

| Ex. | Composition HDPE % | PP % | Graft Copolymer % | Adhesion EVOH lb/in | PP lb/in |
|---|---|---|---|---|---|
| 4 | 90 | — | 10 | 0.0 | 0.3 |
| 5 | 75 | 15 | 10 | 1.0 | 0.2 |
| 6 | 65 | 25 | 10 | 2.9 | 1.2 |
| 7 | 55 | 35 | 10 | 5.5$^F$ | 2.0 |
| 8 | 45 | 45 | 10 | 5.8$^F$ | 3.1 |
| 9 | 35 | 55 | 10 | 5.5 | 7.1 |
| 10 | 47.5 | 47.5 | 5 | 5.8$^F$ | 4.9$^F$ |

$F$ = adhesive film tear

TABLE II

| Ex. | Composition HDPE % | PP % | Graft Copolymer % | Adhesion To Nylon 6, lb/in |
|---|---|---|---|---|
| 11 | 90 | — | 10 | 0.9 |
| 12 | 75 | 15 | 10 | 4.6$^{NT}$ |
| 13 | 65 | 25 | 10 | 3.9$^{NT}$ |
| 14 | 55 | 35 | 10 | 2.5 |
| 15 | 45 | 45 | 10 | 1.7 |
| 16 | 35 | 55 | 10 | 1.3 |
| 17 | 25 | 65 | 10 | 0.7 |

$NT$ = nylon film tear

GLOSSARY OF TERMS

EMA—ethylene-methyl acrylate
EVA—ethylene-vinyl acetate copolymer
EVOH—ethylene-vinyl alcohol copolymer
HDPE—high density polyethylene, preferably of a density of about 0.94–0.97
LDPE—low density polyethylene
LLDPE—linear low density polyethylene
LPLDPE—low pressure low density polyethylene
MFR—melt flow rate, ASTM D 1238, condition L
MI—melt index, ASTM D 1238, condition E
PE—polyethylene
PP—polypropylene: homopolymers of propylene and copolymers of propylene with one or more unsaturated aliphatic hydrocarbons that preferably have up to and including eight carbon atoms
PVA—polyvinyl alcohol
XMNA—x-methylbicyclo(2.2.1)hept-5-ene-2,3-dicarboxylic acid anhydride Having described our invention as related to the embodiments set out herein, it is our intention that the invention be not limited by any of the details of description, unless otherwise specified, but rather be construed broadly within its spirit and scope as set out in the appended claims.

We claim:

1. A method of making a composite structure of components comprising:
   (a) a substrate, and adhered thereto;
   (b) an adhesive blend consisting essentially of
      (i) about 0.1–40 parts by weight in said blend of a graft copolymer of about 70–99.999 wt. % of a polyethylene backbone grafted with about 30–0.001 wt. % of at least one grafting monomer comprising at least one polymerizable ethylenically unsaturated carboxylic acid or carboxylic acid anhydride for a total of 100% and
      (ii) about 99.9–60 parts by weight of a blending resin mixture of about 25–90 wt. % of a high density polyethylene and about 75–10 wt. % of a polypropylene for a total of 100% and wherein said components are adhered together by methods including blown film coextrusion, cast film coextrusion coating, blow molding coextrusion, lamination, extrusion or coextrusion coating, powder coating, rotomolding, profile coextrusion or wire coating extrusion or coextrusion.

2. The method of making a composite structure of components comprising:
   (a) two or more substrates with adjacent pairs adhered together by
   (b) an intervening layer of an adhesive blend consisting essentially of
      (i) about 0.1–40 parts by weight in said blend of a graft copolymer of about 70–99.999 wt. % of a polyethylene backbone grafted with about 30–0.001 wt. % of at least one grafting monomer comprising at least one polymerizable ethylenically unsaturated carboxylic acid or carboxylic acid anhydride for a total of 100% and
      (ii) about 99.9–60 parts by weight of a blending resin mixture of about 25–90 wt. % of a high density polyethylene and about 75–10 wt. % of a polypropylene for a total of 100% and wherein said components are adhered together by methods including blown film coextrusion, cast film coextrusion coating, blow molding coextrusion, lamination, extrusion or coextrusion coating, powder coating, rotomolding, profile coextrusion or wire coating extrusion or coextrusion.

* * * * *